United States Patent
Singh et al.

(10) Patent No.: US 12,327,035 B2
(45) Date of Patent: Jun. 10, 2025

(54) TECHNOLOGIES FOR MEMORY MIRRORING ACROSS AN INTERCONNECT

(71) Applicant: Intel Corporation, Santa Clara, CA (US)

(72) Inventors: Nishant Singh, Bangalore (IN); Daniel W. Liu, Concord, CA (US); Sharada Venkateswaran, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 748 days.

(21) Appl. No.: 17/484,296

(22) Filed: Sep. 24, 2021

(65) Prior Publication Data

US 2022/0011939 A1    Jan. 13, 2022

(51) Int. Cl.
*G06F 11/00* (2006.01)
*G06F 3/06* (2006.01)
*G06F 11/07* (2006.01)

(52) U.S. Cl.
CPC ............ *G06F 3/065* (2013.01); *G06F 3/0619* (2013.01); *G06F 3/0679* (2013.01); *G06F 11/073* (2013.01); *G06F 11/0751* (2013.01); *G06F 11/0772* (2013.01)

(58) Field of Classification Search
CPC .............. G06F 11/073; G06F 11/0772; G06F 11/0751; G06F 11/1666; G06F 11/2017; G06F 11/2056; G06F 11/2087; G06F 3/0619; G06F 3/065; G06F 3/0673; G06F 3/0679
See application file for complete search history.

(56) References Cited

U.S. PATENT DOCUMENTS

| | | | |
|---|---|---|---|
| 7,472,221 B1 * | 12/2008 | Cartmell | G06F 11/2087 711/104 |
| 2004/0172508 A1 | 9/2004 | Nguyen et al. | |
| 2008/0140961 A1 * | 6/2008 | Atherton | G06F 11/1666 711/E12.103 |
| 2011/0078384 A1 * | 3/2011 | Kumar | G06F 12/0817 711/146 |
| 2013/0268739 A1 | 10/2013 | Gupta et al. | |
| 2015/0095693 A1 * | 4/2015 | Chinnakkonda Vidyapoornachary | G06F 11/1666 714/6.23 |
| 2019/0278721 A1 | 9/2019 | Agarwal et al. | |

OTHER PUBLICATIONS

Benini, Luca et al., Networks On Chips: A New SoC Paradigm, 2002, IEEE (Year: 2002).*

(Continued)

*Primary Examiner* — Marc Duncan
(74) *Attorney, Agent, or Firm* — Alliance IP, LLC

(57) ABSTRACT

Technologies for memory mirroring across an interconnect are disclosed. In the illustrative embodiment, a primary memory agent that controls a single memory channel can implement memory mirroring by sending mirrored memory operations to a secondary memory agent over an interconnect. In the illustrative embodiment, the secondary memory agent may not be aware that it is performing mirrored memory operations. The primary memory agent may handle error recovery, scrubbing, and failover to the secondary memory agent.

20 Claims, 6 Drawing Sheets

(56) References Cited

OTHER PUBLICATIONS

3D XPoint, Aug. 29, 2020 (capture retrieved via the Wayback Machine), Wikipeda (Year: 2020).*
Techopedia (Jun. 19, 2013), "Memory Mirroring"—Techopedia. Com, as viewed Sep. 27, 2021, https://www.techopedia.com/definition/12907/memory-mirroring (2 Pages).
EPO; Extended European Search Report issued in EP Patent Application No. 22188881.1, dated Feb. 15, 2023; 8 pages.

* cited by examiner

TECHNOLOGIES FOR MEMORY MIRRORING ACROSS AN INTERCONNECT

BACKGROUND

Memory mirroring can be used to store two copies of data using a single memory agent that interfaces with two memory channels. The memory agent can write data to both channels and access data on the secondary channel if a read operation on the primary channel fails. However, systems with single-channel memory cannot use a single memory agent to implement mirroring as the agent does not have access to two independent memory channels.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
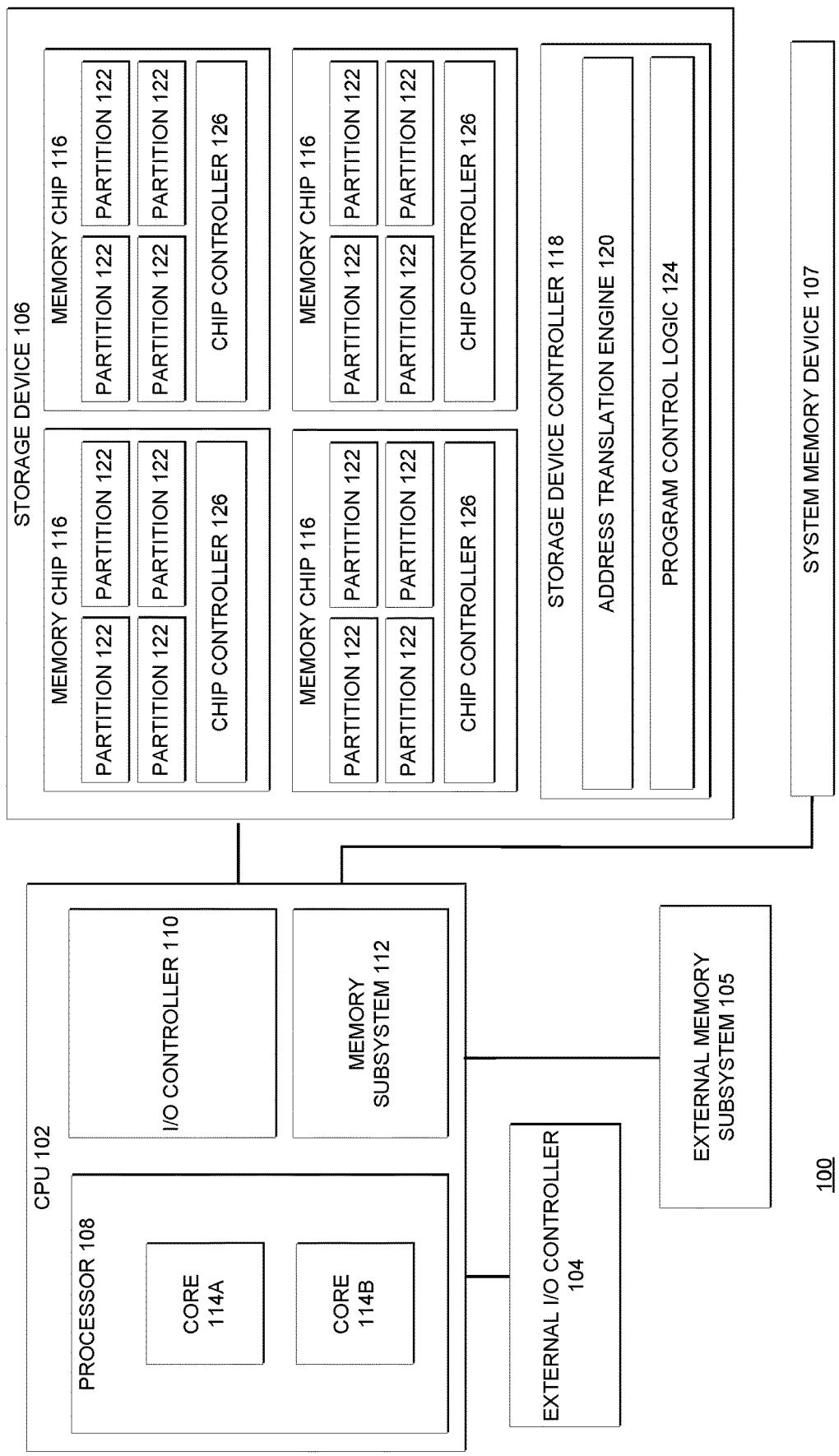
FIG. 1 illustrates components of a computer system in accordance with certain embodiments.

In the illustrative embodiment, as described in more detail below, a memory subsystem 112 includes a primary memory agent 202 and secondary memory agent 206. In the illustrative embodiment, the primary memory agent 202 implements memory mirroring for some or all of the memory range controlled by the memory agent 202. In the illustrative embodiment, the secondary memory agent 206 is not aware that memory mirroring is occurring. The primary memory agent 202 copies all memory write operations to the secondary memory agent 206 and sends read operations to the secondary memory agent 206 when a read operation by the primary memory agent 202 fails, as discussed in more detail below.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Although the drawings depict particular computer systems, the concepts of various embodiments are applicable to any suitable computer system. Examples of systems in which teachings of the present disclosure may be used include desktop computer systems, server computer systems, storage systems, handheld devices, tablets, other thin notebooks, system on a chip (SOC) devices, and embedded applications. Some examples of handheld devices include cellular phones, digital cameras, media players, personal digital assistants (PDAs), and handheld PCs. Embedded applications may include microcontrollers, digital signal processors (DSPs), SOCs, network computers (NetPCs), set-top boxes, network hubs, wide area networks (WANs) switches, or any other system that can perform the functions and operations taught below. Various embodiments of the present disclosure may be used in any suitable computing environment, such as a personal computing device, a server, a mainframe, a cloud computing service provider infrastructure, a datacenter, a communications service provider infrastructure (e.g., one or more portions of an Evolved Packet Core), or other environment comprising one or more computing devices.

FIG. 1 illustrates components of a computer system 100 in accordance with certain embodiments. System 100 includes a central processing unit (CPU) 102 coupled to an external input/output (I/O) controller 104, a storage device 106 such as a solid-state drive (SSD), and system memory device 107. During operation, data may be transferred between a storage device 106 and/or system memory device 107 and the CPU 102. In various embodiments, particular memory access operations (e.g., read and write operations) involving a storage device 106 or system memory device 107 may be issued by an operating system and/or other software applications executed by processor 108. In various embodiments, a storage device 106 may include a storage device controller 118 and one or more memory chips 116 that each comprise any suitable number of memory partitions 122.

In various embodiments, a memory partition 122 may include a 3D crosspoint memory array. In some embodiments, a 3D crosspoint memory array may comprise a transistor-less (e.g., at least with respect to the data storage elements of the memory) stackable crosspoint architecture in which memory cells sit at the intersection of row address lines and column address lines arranged in a grid. In other embodiments, the memory partition 122 may include an array of another type of memory, such as 3D NAND.

CPU 102 comprises a processor 108, such as a microprocessor, an embedded processor, a digital signal processor (DSP), a network processor, a handheld processor, an application processor, a co-processor, an SOC, or other device to execute code (e.g., software instructions). Processor 108, in the depicted embodiment, includes two processing elements (cores 114A and 114B in the depicted embodiment), which may include asymmetric processing elements or symmetric processing elements. However, a processor may include any number of processing elements that may be symmetric or asymmetric. CPU 102 may be referred to herein as a host computing device (though a host computing device may be any suitable computing device operable to issue memory access commands to a storage device 106).

In one embodiment, a processing element refers to hardware or logic to support a software thread. Examples of hardware processing elements include: a thread unit, a thread slot, a thread, a processor unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit component, which potentially includes any number of other processing elements, such as cores or hardware threads.

A core 114 (e.g., 114A or 114B) may refer to logic located on an integrated circuit component capable of maintaining an independent architectural state, wherein each independently maintained architectural state is associated with at least some dedicated execution resources. A hardware thread may refer to any logic located on an integrated circuit component capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

In various embodiments, the processing elements may also include one or more arithmetic logic units (ALUs), floating point units (FPUs), caches, instruction pipelines, interrupt handling hardware, registers, or other hardware to facilitate the operations of the processing elements.

I/O controller 110 is an integrated I/O controller that includes logic for communicating data between CPU 102 and I/O devices. In other embodiments, the I/O controller 110 may be on a different chip from the CPU 102. I/O devices may refer to any suitable devices capable of transferring data to and/or receiving data from an electronic system, such as CPU 102. For example, an I/O device may comprise an audio/video (A/V) device controller such as a graphics accelerator or audio controller; a data storage device controller, such as a magnetic storage disk or optical storage disk controller; a wireless transceiver; a network processor; a network interface controller; or a controller for another input device such as a monitor, printer, mouse, keyboard, or scanner; or other suitable device. In a particular embodiment, an I/O device may comprise a storage device 106 coupled to the CPU 102 through I/O controller 110.

An I/O device may communicate with the I/O controller 110 of the CPU 102 using any suitable signaling protocol, such as peripheral component interconnect (PCI), PCI Express (PCIe), Compute Express Link (CXL), Universal Serial Bus (USB), Serial Attached SCSI (SAS), Serial ATA (SATA), Fibre Channel (FC), IEEE 802.3, IEEE 802.11, or other current or future signaling protocol. In particular embodiments, I/O controller 110 and an associated I/O device may communicate data and commands in accordance with a logical device interface specification such as Non-Volatile Memory Express (NVMe) (e.g., as described by one or more of the specifications available at www.nvmexpress.org/specifications/) or Advanced Host Controller Interface (AHCI) (e.g., as described by one or more AHCI specifications such as Serial ATA AHCI: Specification, Rev. 1.3.1 available at http://www.intel.com/content/www/us/en/io/serial-ata/serial-ata-ahci-spec-rev1-3-1.html). In various embodiments, I/O devices coupled to the I/O controller 110 may be located off-chip (e.g., not on the same chip as CPU 102) or may be integrated on the same chip as the CPU 102.

Memory subsystem 112 is an integrated memory controller that controls the flow of data going to and from one or more system memory devices 107. Memory subsystem 112 may include logic operable to read from a system memory device 107, write to a system memory device 107, or to request other operations from a system memory device 107. In various embodiments, memory subsystem 112 may receive write requests from cores 114 and/or I/O controller 110 and may provide data specified in these requests to a system memory device 107 for storage therein. Memory subsystem 112 may also read data from a system memory device 107 and provide the read data to I/O controller 110 or a core 114. During operation, memory subsystem 112 may issue commands including one or more addresses of the system memory device 107 in order to read data from or write data to memory (or to perform other operations). In some embodiments, memory subsystem 112 may be implemented on the same chip as CPU 102, whereas in other embodiments, memory subsystem 112 may be implemented on a different chip than that of CPU 102. I/O controller 110 may perform similar operations with respect to one or more storage devices 106.

The CPU 102 may also be coupled to one or more other I/O devices through external I/O controller 104. In a particular embodiment, external I/O controller 104 may couple a storage device 106 to the CPU 102. External I/O controller 104 may include logic to manage the flow of data between one or more CPUs 102 and I/O devices. In particular embodiments, external I/O controller 104 is located on a motherboard along with the CPU 102. The external I/O controller 104 may exchange information with components of CPU 102 using point-to-point or other interfaces.

In the illustrative embodiment, various components on the CPU 102 are connected to each other by a link, such as a mesh or ring interconnect or a network-on-a-chip (NoC). The link may be embodied as, e.g., an Intel® Accelerator Link (IAL) link, a Quick Path Interconnect (QPI), Ultra Path Interconnect (UPI), or CXL link.

Figure 2:
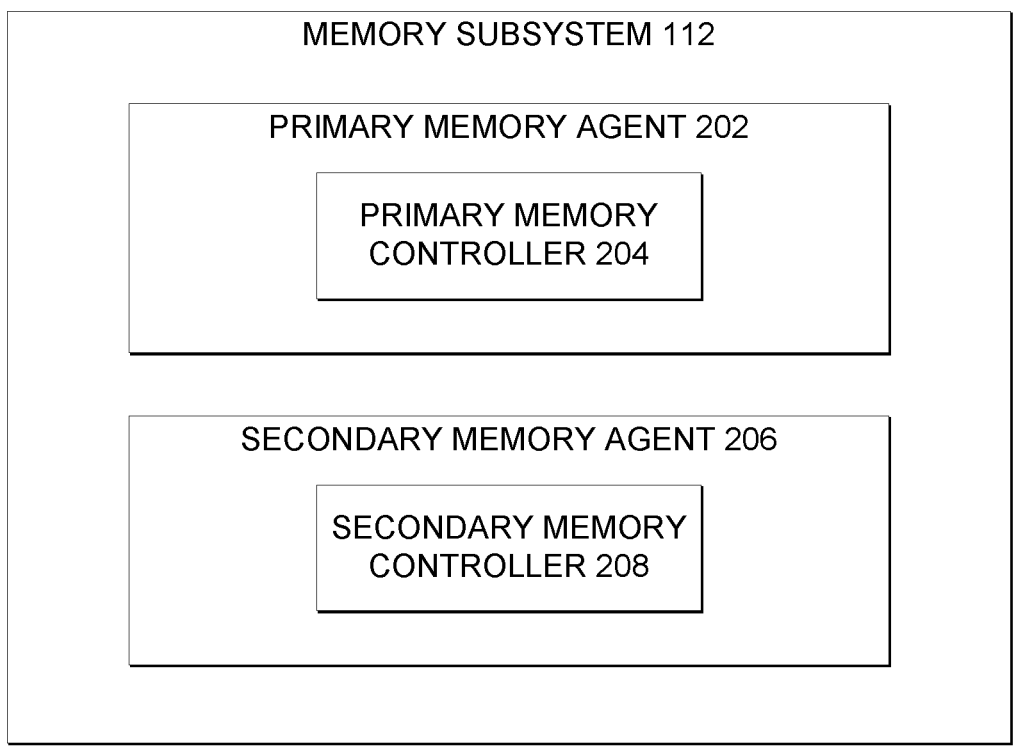
FIG. 2 illustrates components of a memory subsystem of the computer system of FIG. 1 in accordance with certain embodiments.

In some embodiments, the computer system 100 includes an external memory subsystem 105 connected to the CPU 102. The external memory subsystem 105 may be linked to the CPU 102 by, e.g., a CXL or PCIe link. In some embodiments, the external memory subsystem 105 may perform memory mirroring operations. For example, a primary memory agent 202 (see FIG. 2) can copy a memory write operation to a memory agent on the external memory subsystem 105. The external memory subsystem 105 may include a primary memory agent and/or secondary memory agent that is similar to or the same as the primary memory agent 202 and/or secondary memory agent 206 in the memory subsystem 112. The external memory subsystem 105 may be embodied on any suitable type of external device, such as an offload device, an accelerator device, a network interface controller, a graphics processing unit, etc.

A system memory device 107 may store any suitable data, such as data used by processor 108 to provide the functionality of computer system 100. For example, data associated with programs that are executed or files accessed by cores 114 may be stored in system memory device 107. Thus, a system memory device 107 may include a system memory that stores data and/or sequences of instructions that are executed or otherwise used by the cores 114. In various embodiments, a system memory device 107 may store temporary data, persistent data (e.g., a user's files or instruction sequences) that maintains its state even after power to the system memory device 107 is removed, or a combination thereof. A system memory device 107 may be dedicated to a particular CPU 102 or shared with other devices (e.g., one or more other processors or other devices) of computer system 100.

In some embodiments, the system memory device 107 may include one or more high-bandwidth memory tiles. The high-bandwidth memory tiles may be integrated with the CPU 102 and/or with other components on a system-on-a-chip (SoC). It should be appreciated that, in some embodiments, memory operations may be mirrored from a memory agent associated with one high-bandwidth memory tile to a memory agent associated with a different high-bandwidth memory tile.

In various embodiments, a system memory device 107 may include a memory comprising any number of memory partitions, a memory device controller, and other supporting logic (not shown). A memory partition may include non-volatile memory and/or volatile memory.

Non-volatile memory is a storage medium that does not require power to maintain the state of data stored by the medium. Thus, non-volatile memory may have a determinate state even if power is interrupted to the device housing the memory. Nonlimiting examples of non-volatile memory may include any or a combination of: 3D crosspoint memory, phase change memory (e.g., memory that uses a chalcogenide glass phase change material in the memory cells), ferroelectric memory, silicon-oxide-nitride-oxide-silicon (SONOS) memory, polymer memory (e.g., ferroelectric polymer memory), ferroelectric transistor random access memory (Fe-TRAM) ovonic memory, anti-ferroelectric memory, nanowire memory, electrically erasable programmable read-only memory (EEPROM), a memristor, single or multi-level phase change memory (PCM), Spin Hall Effect Magnetic RAM (SHE-MRAM), and Spin Transfer Torque Magnetic RAM (STTRAM), a resistive memory, magnetoresistive random access memory (MRAM) memory that incorporates memristor technology, resistive memory including the metal oxide base, the oxygen vacancy base and the conductive bridge Random Access Memory (CB-RAM), a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory.

Volatile memory is a storage medium that requires power to maintain the state of data stored by the medium (thus, volatile memory is memory whose state (and therefore the data stored on it) is indeterminate if power is interrupted to the device housing the memory). Dynamic volatile memory requires refreshing the data stored in the device to maintain state. One example of dynamic volatile memory includes DRAM (dynamic random access memory), or some variant such as synchronous DRAM (SDRAM). A memory subsystem as described herein may be compatible with a number of memory technologies, such as DDR3 (double data rate version 3, original release by JEDEC (Joint Electronic Device Engineering Council) on Jun. 27, 2007, currently on release 21), DDR4 (DDR version 4, JESD79-4 initial specification published in September 2012 by JEDEC), DDR4E (DDR version 4, extended, currently in discussion by JEDEC), LPDDR3 (low power DDR version 3, JESD209-3B, August 2013 by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5, originally published by JEDEC in January 2020, HBM2 (HBM version 2), originally published by JEDEC in January 2020, or others or combinations of memory technologies, and technologies based on derivatives or extensions of such specifications.

A storage device 106 may store any suitable data, such as data used by processor 108 to provide functionality of computer system 100. For example, data associated with programs that are executed or files accessed by cores 114A and 114B may be stored in storage device 106. Thus, in some embodiments, a storage device 106 may store data and/or sequences of instructions that are executed or otherwise used by the cores 114A and 114B. In various embodiments, a storage device 106 may store persistent data (e.g., a user's files or software application code) that maintains its state even after power to the storage device 106 is removed. A storage device 106 may be dedicated to CPU 102 or shared with other devices (e.g., another CPU or other device) of computer system 100.

In the embodiment depicted, storage device 106 includes a storage device controller 118 and four memory chips 116 each comprising four memory partitions 122 operable to store data. However, a storage device may include any suitable number of memory chips each having any suitable number of memory partitions. A memory partition 122 includes a plurality of memory cells operable to store data. The cells of a memory partition 122 may be arranged in any suitable fashion, such as in rows (e.g., wordlines) and columns (e.g., bitlines), three dimensional structures, sectors, or in other ways. In various embodiments, the cells may be logically grouped into banks, blocks, subblocks, wordlines, pages, frames, bytes, slices, or other suitable groups. In various embodiments, a memory partition 122 may include any of the volatile or non-volatile memories listed above or other suitable memory. In a particular embodiment, each memory partition 122 comprises one or more 3D crosspoint memory arrays. 3D crosspoint arrays are described in more detail in connection with the following figures.

In various embodiments, storage device 106 may comprise a disk drive (e.g., a solid-state drive); a memory card; a Universal Serial Bus (USB) drive; a Dual In-line Memory Module (MINIM), such as a Non-Volatile MINIM (NVDIMM); storage integrated within a device such as a smartphone, camera, or media player; or other suitable mass storage device.

In a particular embodiment, one or more memory chips 116 are embodied in a semiconductor package. In various embodiments, a semiconductor package may comprise a casing comprising one or more semiconductor chips (also referred to as dies). A package may also comprise contact pins or leads used to connect to external circuits. In various embodiments, a memory chip may include one or more memory partitions 122.

Accordingly, in some embodiments, storage device 106 may comprise a package that includes a plurality of chips that each include one or more memory partitions 122. However, a storage device 106 may include any suitable arrangement of one or more memory partitions and associated logic in any suitable physical arrangement. For example, memory partitions 122 may be embodied in one or more different physical mediums, such as a circuit board, semiconductor package, semiconductor chip, disk drive, other medium, or any combination thereof.

System memory device 107 and storage device 106 may comprise any suitable types of memory and are not limited to a particular speed, technology, or form factor of memory in various embodiments. For example, a storage device 106 may be a disk drive (such as a solid-state drive), memory integrated with a computing device (e.g., memory integrated on a circuit board of the computing device), a memory module (e.g., a dual in-line memory module) that may be inserted in a memory socket, or other type of storage device. Similarly, system memory 107 may have any suitable form factor. Moreover, computer system 100 may include multiple different types of storage devices.

System memory device 107 or storage device 106 may include any suitable interface to communicate with memory subsystem 112 or I/O controller 110 using any suitable communication protocol such as a DDR-based protocol, PCI, PCIe, USB, SAS, SATA, FC, System Management Bus (SMBus), or other suitable protocol. In some embodiments, a system memory device 107 or storage device 106 may also include a communication interface to communicate with memory subsystem 112 or I/O controller 110 in accordance with any suitable logical device interface specification such as NVMe, AHCI, or other suitable specification. In particular embodiments, system memory device 107 or storage device 106 may comprise multiple communication interfaces that each communicate using a separate protocol with memory subsystem 112 and/or I/O controller 110.

Storage device controller 118 may include logic to receive requests from CPU 102 (e.g., via an interface that communicates with memory subsystem 112 or I/O controller 110), cause the requests to be carried out with respect to the memory chips 116, and provide data associated with the requests to CPU 102 (e.g., via memory subsystem 112 or I/O controller 110). Storage device controller 118 may also be operable to detect and/or correct errors encountered during memory operations via an error correction code (ECC engine). In various embodiments, controller 118 may also monitor various characteristics of the storage device 106, such as the temperature or voltage and report associated statistics to the CPU 102. Storage device controller 118 can be implemented on the same circuit board or device as the memory chips 116 or on a different circuit board or device. For example, in some environments, storage device controller 118 may be a centralized storage controller that manages memory operations for multiple different storage devices 106 of computer system 100.

In various embodiments, the storage device 106 also includes program control logic 124, which is operable to control the programming sequence performed when data is written to or read from a memory chip 116. In various embodiments, program control logic 124 may provide the various voltages (or information indicating which voltages should be provided) that are applied to memory cells during the programming and/or reading of data (or perform other operations associated with read or program operations), perform error correction, and perform other suitable functions.

In various embodiments, the program control logic 124 may be integrated on the same chip as the storage device controller 118 or on a different chip. In the depicted embodiment, the program control logic 124 is shown as part of the storage device controller 118, although in various embodiments, all or a portion of the program control logic 124 may be separate from the storage device controller 118 and communicably coupled to the storage device controller 118. For example, all or a portion of the program control logic 124 described herein may be located on a memory chip 116. In various embodiments, reference herein to a "controller" may refer to any suitable control logic, such as storage device controller 118, chip controller 126, or a partition controller. In some embodiments, reference to a controller may contemplate logic distributed on multiple components, such as logic of a storage device controller 118, chip controller 126, and/or a partition controller.

In various embodiments, storage device controller 118 may receive a command from a host device (e.g., CPU 102), determine a target memory chip for the command, and communicate the command to a chip controller 126 of the target memory chip. In some embodiments, the storage device controller 118 may modify the command before sending the command to the chip controller 126.

The chip controller 126 may receive a command from the storage device controller 118 and determine a target memory partition 122 for the command. The chip controller 126 may then send the command to a controller of the determined memory partition 122. In various embodiments, the chip controller 126 may modify the command before sending the command to the controller of the partition 122.

In some embodiments, all or some of the elements of system 100 are resident on (or coupled to) the same circuit board (e.g., a motherboard). In various embodiments, any suitable partitioning between the elements may exist. For example, the elements depicted in CPU 102 may be located on a single die (e.g., on-chip) or package or any of the elements of CPU 102 may be located off-chip or off-package. Similarly, the elements depicted in storage device 106 may be located on a single chip or on multiple chips. In various embodiments, a storage device 106 and a computing host (e.g., CPU 102) may be located on the same circuit board or on the same device and in other embodiments the storage device 106 and the computing host may be located on different circuit boards or devices.

The components of system 100 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g., cache coherent) bus, a layered protocol architecture, a differential bus, and a Gunning transceiver logic (GTL) bus. In various embodiments, an integrated I/O subsystem includes point-to-point multiplexing logic between various components of system 100, such as cores 114, one or more CPU memory controllers 112, I/O controller 110, integrated I/O devices, direct memory access (DMA) logic (not shown), etc. In various embodiments, components of computer system 100 may be coupled together through one or more networks comprising any number of intervening network nodes, such as routers, switches, or other computing devices. For example, a computing host (e.g., CPU 102) and the storage device 106 may be communicably coupled through a network.

Although not depicted, system 100 may use a battery and/or power supply outlet connector and associated system to receive power, a display to output data provided by CPU 102, or a network interface allowing the CPU 102 to communicate over a network. In various embodiments, the battery, power supply outlet connector, display, and/or network interface may be communicatively coupled to CPU 102. Other sources of power can be used, such as renewable energy (e.g., solar power or motion-based power).

Figure 5:
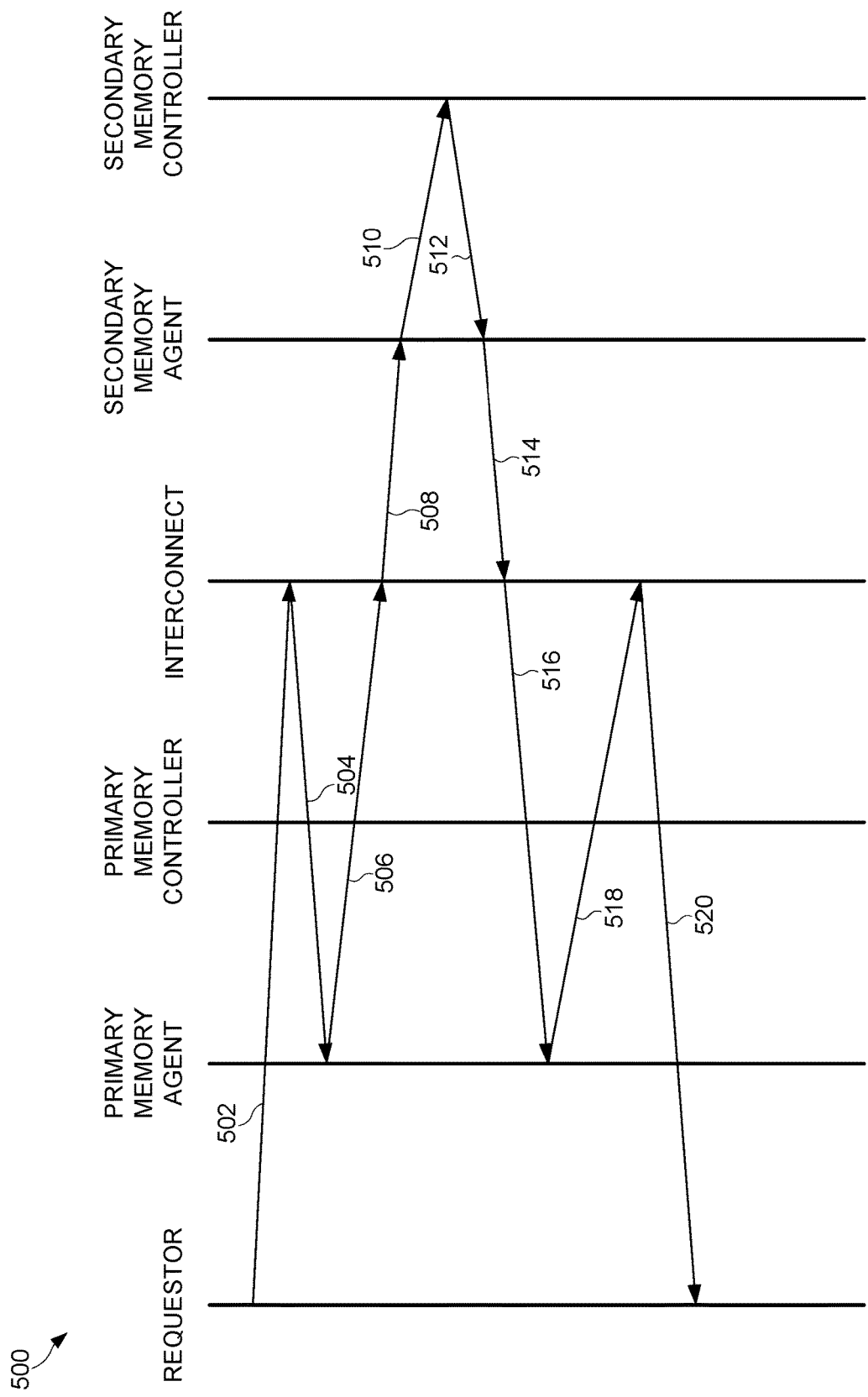
FIG. 5 illustrates a simplified flow diagram of at least one embodiment for performing a memory read operation with a failover to a second channel.

Referring now to FIG. 5, in one embodiment, the memory subsystem 112 includes a primary memory agent 202 and a secondary memory agent 206. The memory subsystem 112 may be implemented in any circuitry or collection of circuits capable of performing the function described herein. In some embodiments, some or all of the memory subsystem 112 may be programmable, such as with software or firmware.

The primary memory agent 202 is configured to receive memory operations (e.g., from the processor 108 or I/O controller 110) and send memory operations to an appropriate storage device, such as the system memory device 107. In the illustrative embodiment, the primary memory agent 202 can implement memory mirroring for some or all of the memory space that the primary memory agent 202 controls. The illustrative primary memory agent 202 can implement mirroring without other components, such as the secondary memory agent 206 being configured for mirroring or even being aware that mirroring is being done. As such, the primary memory agent 202 can implement mirroring even with a secondary memory agent 206 that does not implement any specific mirroring functionality. In some embodiments, the primary memory agent 202 may use a secondary memory agent for mirroring that is a remote memory agent, such as a memory agent on the external memory subsystem 105 on an offload device connected to the CPU 102 by, e.g., a CXL link. In some embodiments, the secondary memory agent 206 may interface with a different amount or type of memory as the primary memory agent 202. For example, the primary memory agent 202 may interface with a double data rate (DDR) memory device, and the secondary memory agent 206 may interface with a three-dimensional crosspoint memory device.

The primary memory agent 202 may be configured for full or partial mirroring. In full mirroring, all of the memory controlled by the primary memory agent 202 is mirrored to the secondary memory agent 206. In partial mirroring, some of the memory controlled by the primary memory agent 202 is mirrored to the secondary memory agent 206. For example, if the primary memory agent 202 controls six gigabytes of memory, gigabytes 0-2 may be mirrored, gigabytes 2-4 may not be mirrored, and gigabytes 4-6 may be mirrored.

In the illustrative embodiment, the primary memory agent 202 and primary memory controller 204 are connected to a memory device by a single channel. As such, the primary memory agent 202 cannot implement mirroring by using two independent channels to memory devices. In other embodiments, the primary memory agent 202 and primary memory controller 204 may be connected to more than one memory channel.

In the illustrative embodiment, the primary memory agent 202 uses one secondary memory agent 206. In other embodiments, the primary memory agent 202 may send mirroring memory operations to two or more secondary memory agents 206, such as by using a load balancing algorithm.

As used herein, the primary memory agent 202 refers to the memory agent that is receiving memory operations for a particular memory range from a process or other function. The primary memory agent 202, when implementing mirroring, sends mirrored memory operations to the secondary memory agent 206. However, it should be appreciated that the secondary memory agent 206 can implement some or all of the same functionality as the primary memory agent 202. For example, the secondary memory agent 206 may act as the primary memory agent for certain memory requests.

In the illustrative embodiment, the primary memory agent 202 includes a primary memory controller 204. The primary memory controller 204 is configured to interface with a memory device and send and receive commands and data to and from the memory device. Similarly, the secondary memory agent 206 may include a secondary memory controller 208, which may be similar to the primary memory controller 204.

The illustrative computer system 100 may include performance monitors that monitor, e.g., memory read and write operations to and from a memory agent. As such, in use, a performance monitor may detect a memory operation that is sent to the primary memory agent 202 and mirrored to the secondary memory agent 206.

Figure 3:
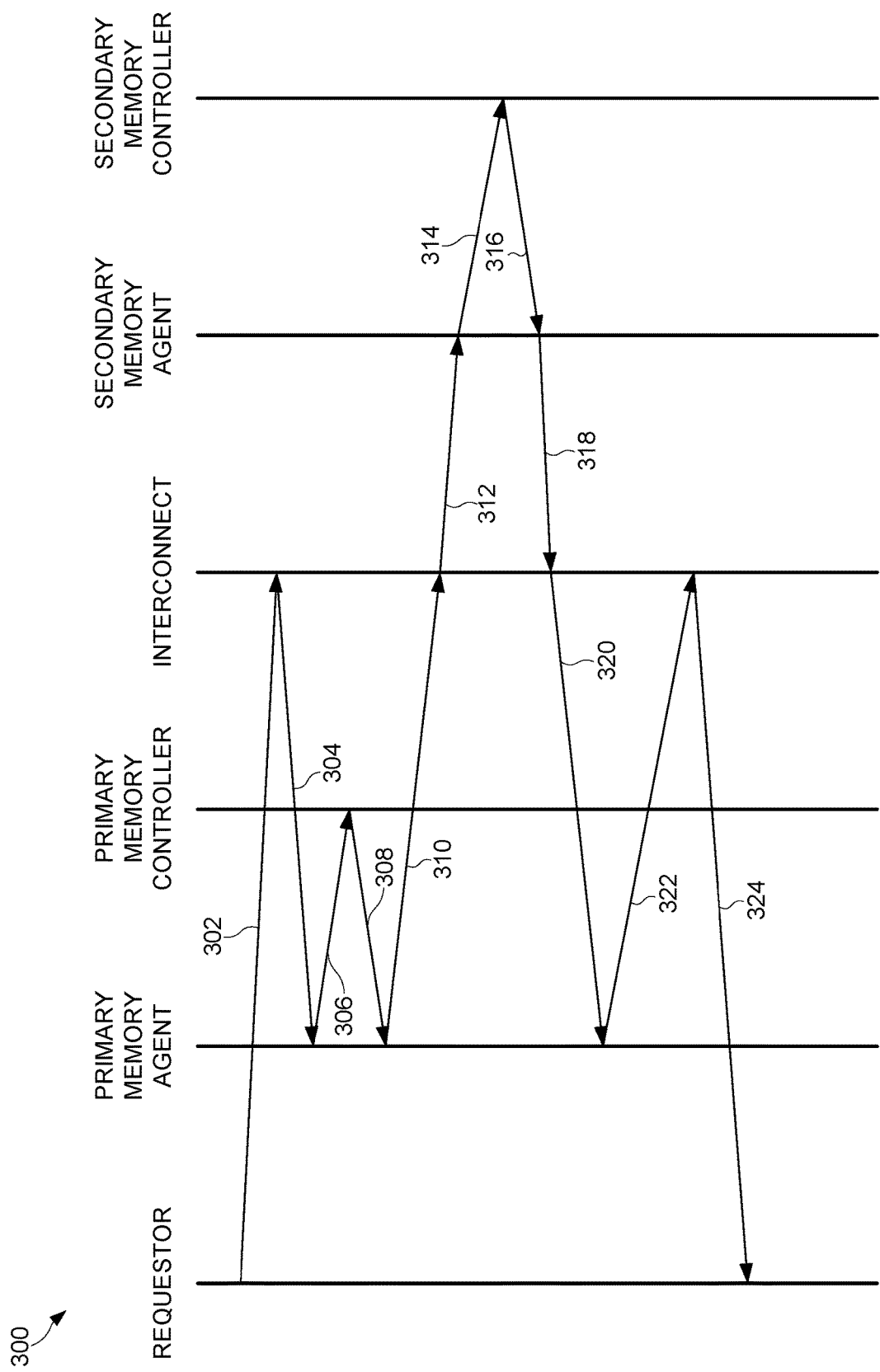
FIG. 3 illustrates a simplified flow diagram of at least one embodiment for performing a memory write operation with mirroring.

Referring now to FIG. 3, in use, memory subsystem 112 can implement a flow 300 for a memory write operation. The flow 300 begins with step 302, in which a requestor sends a memory write operation to an interconnect. The requestor may be, e.g., a core 114 of the processor 108, the I/O controller 110, and/or any other suitable component. In some embodiments, the requestor may be a caching and home agent. The memory write operation may include data to be written, a memory address, a transaction identifier, and/or other parameters. In the illustrative embodiment, the transaction identifier is a unique identifier that identifies an operation between the requestor and the primary memory agent 202. The transaction identifier will not be reused until the transaction is completed. The interconnect may be, e.g., an IAL link, a CXL link, a network-on-a-chip (NoC), etc. In the illustrative embodiment, the interconnect is an NoC that connects the requestor (e.g., a core 114) to the primary memory agent 202 and the secondary memory agent 206. Additionally or alternatively, the interconnect may include an interconnect from, e.g., the CPU 102 to the external memory subsystem 105. For example, a core 114 may send a memory write operation to the primary memory agent 202 over an interconnect contained within the CPU 102, and the primary memory agent 202 may send a mirrored memory write operation over an external interconnect to a secondary memory agent on the external memory subsystem 105.

In step 304, the memory write operation is sent to the primary memory agent 202. In step 306, the primary memory agent 202 sends a command to the primary memory controller 204 to perform the write operation. The command to the primary memory controller 204 and/or to the storage device may be, e.g., a Converged Memory Interface (CMI) command. In other embodiments, different protocols may be used. In the illustrative embodiment, the primary memory agent 202 generates a second transaction identifier different from the transaction identifier sent from the requestor. The primary memory agent 202 may use the second transaction identifier when sending commands to the primary memory controller 204 and/or to the secondary memory agent 206 in order to keep track of the transactions. The primary memory controller 204 tracks transactions in a request tracker that stores, e.g., the transaction identifier sent by the requestor, the second transaction identifier, the operation type, etc.

In step 308, after completing the memory operation, the primary memory controller 204 sends back a completion message with the second transaction identifier indicating that the memory write operation has been completed successfully. The primary memory controller 204 may determine based on, e.g., the memory address that the memory write operation should be mirrored.

In step 310, the primary memory agent 202 sends a mirrored memory write operation to the interconnect, and in step 312 the mirrored memory write operation is sent to the secondary memory agent 206. In the illustrative embodiment, the mirrored memory write operation sent to the secondary memory agent 206 is the same as the memory write operation sent to the primary memory agent 202, except the mirrored memory write operation sent to the secondary memory agent 206 has the second transaction identifier.

In step 314, the secondary memory agent 206 sends a command to the secondary memory controller 208 to perform the mirrored memory write operation. The command to the secondary memory controller 208 may be similar to the command to the primary memory controller 204 in step 306.

In step 316, the secondary memory controller 208 sends back a completion message to the secondary memory agent 206. The secondary memory agent 206 then sends a completion message to the interconnect in step 318, which is then sent to the primary memory agent 202 in step 320. The completion messages include the second transaction identifier.

The primary memory agent 202 receives the completion message. The primary memory agent 202 checks the request tracker for the second transaction identifier and retrieves the transaction identifier sent by the requestor. The primary memory agent 202 then sends a completion message with the original transaction identifier to the interconnect in step 322, and the completion message is sent back to the requestor in block 324, completing the memory write operation.

It should be appreciated that, in the flow 300, the secondary memory agent 206 is not aware that the memory write operation is a mirrored memory write operation. Rather, the secondary memory agent 206 can treat the memory write operation as any other memory write operation: the secondary memory agent 206 receives a memory write operation, completes the memory write operation, and sends back a completion message to the component that sent the memory write operation. As such, the secondary memory agent 206 does not require any additional functionality in order to perform the mirrored memory write operation.

Figure 4:
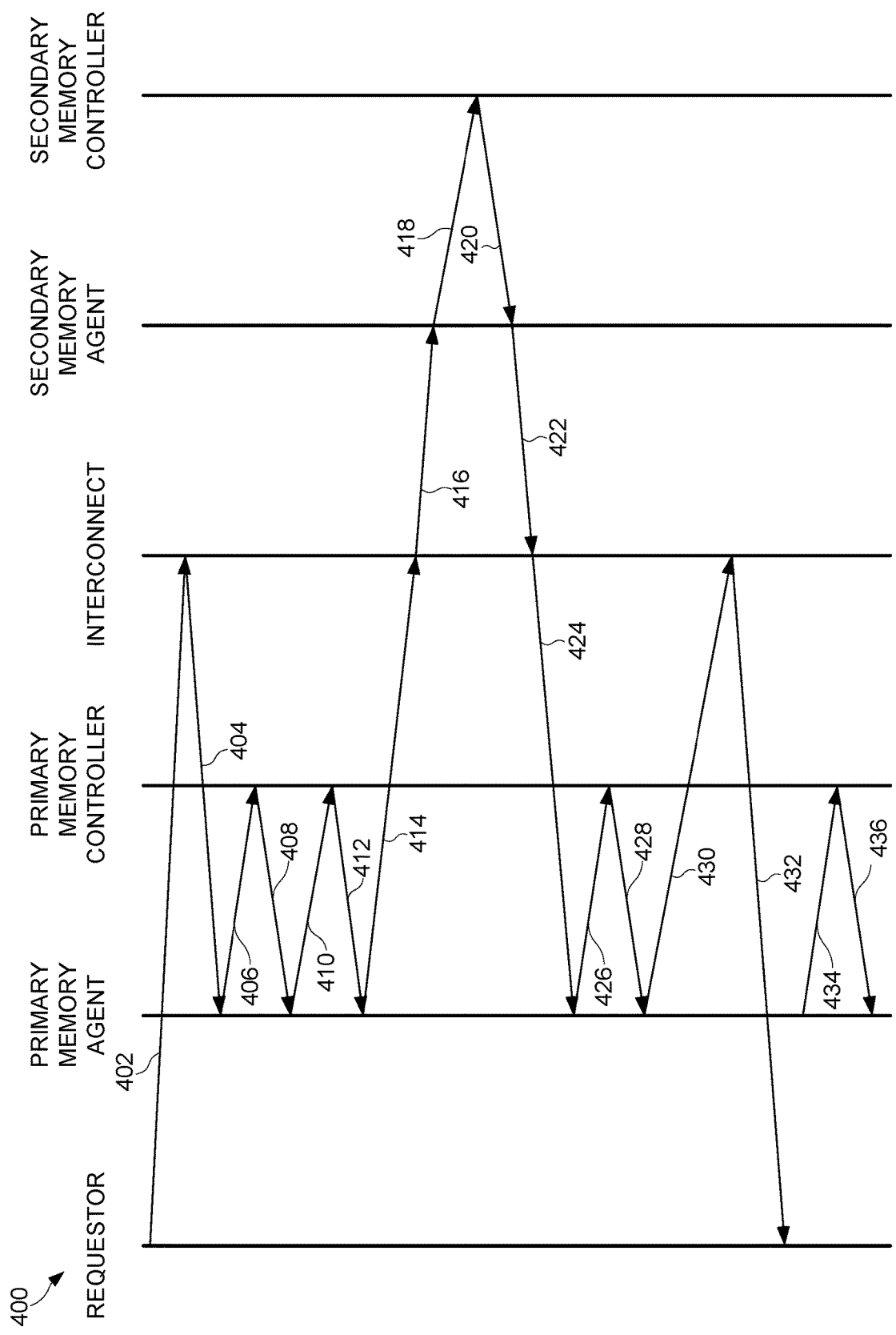
FIG. 4 illustrates a simplified flow diagram of at least one embodiment for performing a memory read operation with error recovery.

Referring now to FIG. 4, in use, memory subsystem 112 can implement a flow 400 for a memory read operation in which an error occurs on a read to the primary memory. The flow 400 begins with step 402, in which a requestor sends a memory read operation to an interconnect. The memory read operation may include a memory address, a transaction identifier, and/or other parameters.

In step 404, the memory read operation is sent to the primary memory agent 202. In step 406, the primary memory agent 202 sends a command to the primary memory controller 204 to perform the read operation. The command to the primary memory controller 204 and/or to the storage device may be, e.g., a Coherent Memory Interface (CMI) command. In other embodiments, different protocols may be used. In the illustrative embodiment, the primary memory agent 202 generates a second transaction identifier that is sent with the read command sent to the primary memory controller 204.

In step 408, the primary memory controller 204 sends back a message indicating that the memory read operation was not completed successfully. The primary memory controller 204 may send a message indicating an error or may send poison data, indicating a failure. In the illustrative embodiment, the primary memory agent 202 will try again by sending another command to the primary memory controller 204 to perform the read operation in step 410. If the error occurs again, the primary memory controller 204 sends an error message or poison data in step 412.

In order to retrieve the data corresponding to the memory read operation, the primary memory agent 202 sends a mirrored memory read operation to the interconnect in step 414, and the mirrored memory read operation is sent to the secondary memory agent 206 in step 416 along with the second transaction identifier. The secondary memory agent 206 sends a command to the secondary memory controller 208 to perform the read command in step 418. The secondary memory controller 208 performs the read command and sends back the data in step 420. In some embodiments, the secondary memory controller 208 may send the data in a separate message from a message indicating that the memory operation was complete.

In step 422, the secondary memory agent 206 sends the data from the read command to the interconnect, and then the data is sent to the primary memory agent 202 in step 424. As for the write command discussed above, the secondary memory agent 206 does not need to be aware that the read command is a mirrored read command; rather, the secondary memory agent 206 receives a read command and sends the result to the requesting component without needing to be aware of the context of the operation.

The primary memory agent 202 can use the second transaction identifier included in the message from the secondary memory agent 206 to identify the relevant transaction in the request tracker. In step 426, the primary memory agent 202 scrubs the data to the local memory by sending a write command to the primary memory controller 204. In step 428, the primary memory controller 204 sends a completion message to the primary memory agent 202. In the illustrative embodiment, the data is not scrubbed back to the secondary memory agent 206. In other embodiments, the data may be scrubbed back to the secondary memory agent 206.

After the data has been scrubbed back into the primary memory, the primary memory agent 202 sends the data to the interconnect in step 430, and then the data is sent to the requestor in step 432.

In the illustrative embodiment, the primary memory agent 202 checks whether the scrub was successful. If the scrub was not successful, then that is an indication that the memory may be damaged. The check of whether the scrub was successful may be done synchronously (e.g., immediately after completing the memory read operation) or asynchronously (e.g., may be scheduled for a future time).

To check whether the scrub was successful, the primary memory agent 202 sends a read command to the primary memory controller 204 in step 434. The primary memory controller 204 performs the read command and sends a response back to the primary memory agent 202 in step 436. If the data is received, then the operation was successful. If an error or poison data is received, then the read operation was not successful. If a failure or error is detected, the primary memory agent 202 can provide an indication of the failure to the computer system 100. For example, the primary memory agent 202 may increment a register indicating that a repeated failure was detected. If the register reaches a threshold amount (e.g., 2-50), then the computer system 100 (such as the basic input/output system (BIOS) or system management interrupt (SMI)) may conclude that the system memory device 107 is faulty and initiate a failover from the primary memory agent 202 to the secondary memory agent 206. The failover may be instituted by, e.g., flipping a register in the primary memory agent 202.

In rare cases, the memory read operation by the secondary memory controller may fail as well. In such instances, the result (e.g., an uncorrected error or a poison value) may be returned to the primary memory agent 202 and then to the requestor, allowing the requestor to become aware of the error and handle it appropriately.

Referring now to FIG. 5, in use, memory subsystem 112 can implement a flow 500 for a memory read operation when the primary memory agent 202 is failed over to the secondary memory agent 206. The flow 500 begins with step 502, in which a requestor sends a memory read operation to an interconnect. The memory read operation may include a memory address, a transaction identifier, and/or other parameters.

In step 504, the memory read operation is sent to the primary memory agent 202. The primary memory agent 202 checks whether a register indicating failover to the secondary memory agent 206 is set. If it is, in step 506, the primary memory agent 202 sends a memory read operation to the interconnect, and the memory read operation is sent to the secondary memory agent 206 in step 508. The secondary memory agent 206 sends a command to the secondary memory controller 208 to perform the read command in step 510. The secondary memory controller 208 performs the read command and sends back the data in step 512. In some embodiments, the secondary memory controller 208 may send the data in a separate message from a message indicating that the memory operation was complete.

In step 514, in the illustrative embodiment, the secondary memory agent 206 sends the data from the read command to the interconnect, and then the data is sent to the primary memory agent 202 in step 516. In other embodiments, the secondary memory agent 206 may send the data from the read command directly to the requestor over the interconnect.

The primary memory agent 202 can use the second transaction identifier included in the message from the secondary memory agent 206 to identify the relevant transaction in the request tracker. The primary memory agent 202 sends the data to the interconnect in step 518, and then the data is sent to the requestor in step 520.

Figure 6:
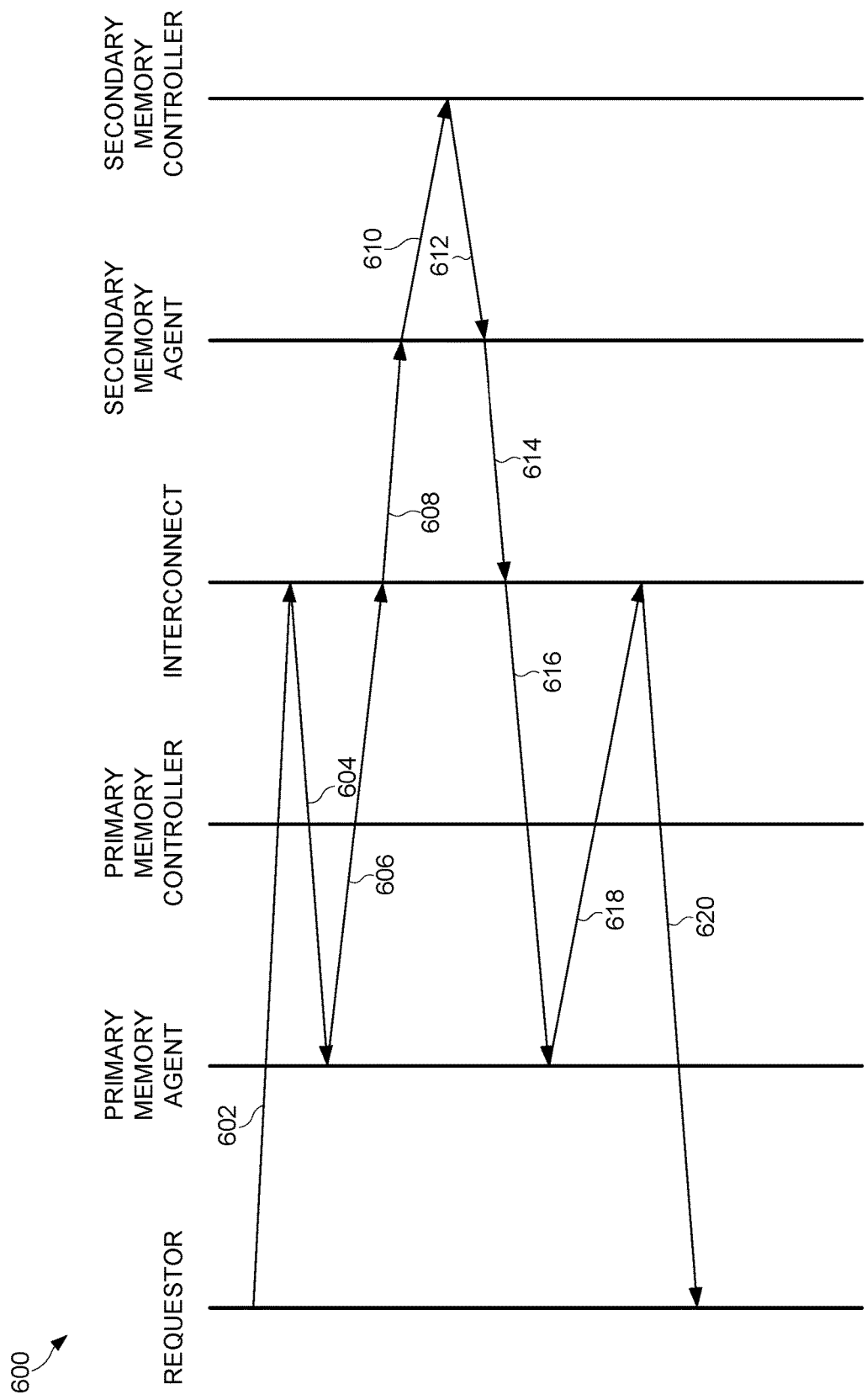
FIG. 6 illustrates a simplified flow diagram of at least one embodiment for performing a memory write operation with a failover to a second channel.

Referring now to FIG. 6, in use, memory subsystem 112 can implement a flow 600 for a memory write operation when the primary memory agent 202 is failed over to the secondary memory agent 206. The flow 600 begins with step 602, in which a requestor sends a memory write operation to an interconnect. The memory write operation may include a memory address, a transaction identifier, data to be written, and/or other parameters.

In step 604, the memory write operation is sent to the primary memory agent 202. The primary memory agent 202 checks whether a register indicating failover to the secondary memory agent 206 is set. If it is, in step 606, the primary memory agent 202 sends a memory write operation to the interconnect, and the memory write operation is sent to the secondary memory agent 206 in step 608. The secondary memory agent 206 sends a command to the secondary memory controller 208 to perform the write command in step 610. The secondary memory controller 208 performs the write command and sends back a confirmation message in step 612.

In step 614, the secondary memory agent 206 sends a confirmation message of the write command to the interconnect, and then the message is sent to the primary memory agent 202 in step 616. The primary memory agent 202 can use the second transaction identifier included in the message from the secondary memory agent 206 to identify the relevant transaction in the request tracker. The primary memory agent 202 sends a confirmation message to the interconnect in step 618, and then the confirmation message is sent to the requestor in step 620.

It should be appreciated that additional memory flows are possible besides the flows presented in FIGS. 3-6. Generally, the memory operation received by the primary memory agent 202 will be mirrored essentially identically to the secondary memory agent 206 (with an update to the transaction identifier). However, in some embodiments, the memory operation may be changed when the mirrored memory operation is sent. For example, in one embodiment, a memory invalidate (meminv) operation may be sent to the primary memory agent 202. If the primary memory agent 202 has an error in performing the operation, the memory invalidate operation may be mirrored to the secondary memory agent 206 as a memory read. The memory read may be used because it will result in the data being sent back to the primary memory agent 202, allowing the primary memory agent 202 to scrub the correct data back into primary memory.

EXAMPLES

Illustrative examples of the technologies disclosed herein are provided below. An embodiment of the technologies may include any one or more, and any combination of, the examples described below.

Example 1 includes an integrated circuit component comprising a primary memory agent to receive a memory write operation comprising memory write data; send the memory write data to a memory device for storage; and send a mirrored memory write operation comprising the memory write data to a secondary memory agent.

Example 2 includes the subject matter of Example 1, and wherein the secondary memory agent is part of the integrated circuit component, wherein to receive the memory write operation comprises to receive the memory write operation over a network-on-a-chip (NoC) from a requestor, wherein the requestor is part of the integrated circuit component, wherein to send the mirrored memory write operation to the secondary memory agent comprises to send the mirrored memory write operation over the NoC.

Example 3 includes the subject matter of any of Examples 1 and 2, and wherein the secondary memory agent is external to the integrated circuit component, wherein to receive the memory write operation comprises to receive the memory write operation over a network-on-a-chip (NoC) from a requestor, wherein the requestor is part of the integrated circuit component, wherein to send the mirrored memory write operation to the secondary memory agent comprises to send the mirrored memory write operation over an external interconnect.

Example 4 includes the subject matter of any of Examples 1-3, and wherein the external interconnect is a Compute Express Link (CXL).

Example 5 includes the subject matter of any of Examples 1-4, and wherein the primary memory agent is connected to a single memory channel.

Example 6 includes the subject matter of any of Examples 1-5, and wherein the secondary memory agent does not receive any indication that the mirrored memory write operation is mirrored from the primary memory agent.

Example 7 includes the subject matter of any of Examples 1-6, and wherein the primary memory agent is further to receive a memory read operation from a requestor; send the memory read operation to the memory device; receive, from the memory device, an indication that the memory read operation was not successful; send, in response to the indication that the memory read operation was not successful, a mirrored memory read operation to the secondary memory agent; receive memory read data corresponding to the memory read operation from the secondary memory agent; and send the memory read data corresponding to the memory read operation to the requestor.

Example 8 includes the subject matter of any of Examples 1-7, and wherein the primary memory agent is further to send, in response to receipt of the memory read data corresponding to the memory read operation from the secondary memory agent, a memory write operation comprising the memory read data to the memory device.

Example 9 includes the subject matter of any of Examples 1-8, and wherein the primary memory agent is further to determine, in response to receipt of the indication that the memory read operation was not successful, that the memory device is faulty; and set, in response to a determination that the memory device is faulty, a register indicating the memory device is faulty.

Example 10 includes the subject matter of any of Examples 1-9, and wherein the primary memory agent is further to increment, in response to receipt of the indication that the memory read operation was not successful, a register indicating a number of faults of the memory device, wherein to determine that the memory device is faulty comprises to determine that the memory device is faulty.

Example 11 includes the subject matter of any of Examples 1-10, and wherein the primary memory agent is further to receive a second memory read operation from the requestor; determine, based on the register, that the memory device is faulty; send, in response to a determination that the memory device is faulty, a mirrored memory read operation to the secondary memory agent; receive additional memory read data corresponding to the memory read operation from the secondary memory agent; and send the additional memory read data corresponding to the memory read operation to the requestor.

Example 12 includes the subject matter of any of Examples 1-11, and wherein the memory write operation comprises a first transaction identifier, wherein to send the mirrored memory write operation to the secondary memory agent comprises to send the mirrored memory write operation to the secondary memory agent with a second transaction identifier different from the first transaction identifier.

Example 13 includes the subject matter of any of Examples 1-12, and wherein the primary memory agent is further to receive a memory invalidate operation from a requestor; send the memory invalidate operation to the memory device; receive, from the memory device, an indication that the memory invalidate operation was not successful; send, in response to the indication that the memory invalidate operation was not successful, a mirrored memory read operation to the secondary memory agent; receive memory read data corresponding to the mirrored memory read operation from the secondary memory agent; and send, in response to receipt of the memory read data from the secondary memory agent, a data completion message to the requestor.

Example 14 includes the subject matter of any of Examples 1-13, and wherein the primary memory agent is further to send, in response to receipt of the memory read data corresponding to the memory read operation from the secondary memory agent, a memory write operation comprising the memory read data to the memory device.

Example 15 includes the subject matter of any of Examples 1-14, and wherein the secondary memory agent controls a second memory device, wherein the second memory device is a different type from the memory device.

Example 16 includes the subject matter of any of Examples 1-15, and wherein the memory device is a double data rate (DDR) memory device, wherein the second memory device is a three-dimensional crosspoint memory device.

Example 17 includes the subject matter of any of Examples 1-16, and wherein the integrated circuit component is a system-on-a-chip comprising a processor.

Example 18 includes the subject matter of any of Examples 1-17, and further including a performance monitor to detect a memory write operation sent to the primary memory agent; and detect a mirrored memory write operation sent to the secondary memory agent by the primary memory agent.

Example 19 includes a method comprising receiving, by a primary memory agent, a memory write operation comprising memory write data; sending, by the primary memory agent, the memory write data to a memory device for storage; and sending, by the primary memory agent, a mirrored memory write operation comprising the memory write data to a secondary memory agent.

Example 20 includes the subject matter of Example 19, and wherein the primary memory agent is part of an integrated circuit component, wherein the secondary memory agent is part of the integrated circuit component, wherein receiving the memory write operation comprises receiving the memory write operation over a network-on-a-chip (NoC) from a requestor, wherein the requestor is part of the integrated circuit component, wherein sending the mirrored memory write operation to the secondary memory agent comprises sending the mirrored memory write operation over the NoC.

Example 21 includes the subject matter of any of Examples 19 and 20, and wherein the primary memory agent is part of an integrated circuit component, wherein the secondary memory agent is external to the integrated circuit component, wherein receiving the memory write operation comprises receiving the memory write operation over a network-on-a-chip (NoC) from a requestor, wherein the requestor is part of the integrated circuit component, wherein sending the mirrored memory write operation to the secondary memory agent comprises sending the mirrored memory write operation over an external interconnect.

Example 22 includes the subject matter of any of Examples 19-21, and wherein the external interconnect is a Compute Express Link (CXL).

Example 23 includes the subject matter of any of Examples 19-22, and wherein the primary memory agent is connected to a single memory channel.

Example 24 includes the subject matter of any of Examples 19-23, and wherein the secondary memory agent does not receive any indication that the mirrored memory write operation is mirrored from the primary memory agent.

Example 25 includes the subject matter of any of Examples 19-24, and further including receiving, by the primary memory agent, a memory read operation from a requestor; sending, by the primary memory agent, the memory read operation to the memory device; receiving, by the primary memory agent and from the memory device, an indication that the memory read operation was not successful; sending, by the primary memory agent and in response to the indication that the memory read operation was not successful, a mirrored memory read operation to the secondary memory agent; receiving, by the primary memory agent, memory read data corresponding to the memory read operation from the secondary memory agent; and sending, by the primary memory agent, the memory read data corresponding to the memory read operation to the requestor.

Example 26 includes the subject matter of any of Examples 19-25, and further including sending, by the primary memory agent and in response to receipt of the memory read data corresponding to the memory read operation from the secondary memory agent, a memory write operation comprising the memory read data to the memory device.

Example 27 includes the subject matter of any of Examples 19-26, and further including determining, by the primary memory agent and in response to receipt of the indication that the memory read operation was not successful, that the memory device is faulty; and setting, by the primary memory agent and in response to a determination that the memory device is faulty, a register indicating the memory device is faulty.

Example 28 includes the subject matter of any of Examples 19-27, and further including incrementing, by the primary memory agent and in response to receipt of the indication that the memory read operation was not successful, a register indicating a number of faults of the memory device, wherein determining that the memory device is faulty comprises determining that the memory device is faulty.

Example 29 includes the subject matter of any of Examples 19-28, and further including receiving, by the primary memory agent, a second memory read operation from the requestor; determining, by the primary memory agent and based on the register, that the memory device is faulty; sending, by the primary memory agent and in response to a determination that the memory device is faulty, a mirrored memory read operation to the secondary memory agent; receiving, by the primary memory agent, additional memory read data corresponding to the memory read operation from the secondary memory agent; and sending, by the primary memory agent, the additional memory read data corresponding to the memory read operation to the requestor.

Example 30 includes the subject matter of any of Examples 19-29, and wherein the memory write operation comprises a first transaction identifier, wherein sending the mirrored memory write operation to the secondary memory agent comprises sending the mirrored memory write operation to the secondary memory agent with a second transaction identifier different from the first transaction identifier.

Example 31 includes the subject matter of any of Examples 19-30, and further including receiving, by the primary memory agent, a memory invalidate operation from a requestor; sending, by the primary memory agent, the memory invalidate operation to the memory device; receiving, by the primary memory agent and from the memory device, an indication that the memory invalidate operation was not successful; sending, by the primary memory agent and in response to the indication that the memory invalidate operation was not successful, a mirrored memory read operation to the secondary memory agent; receiving, by the primary memory agent, memory read data corresponding to the mirrored memory read operation from the secondary memory agent; and sending, by the primary memory agent and in response to receipt of the memory read data from the secondary memory agent, a data completion message to the requestor.

Example 32 includes the subject matter of any of Examples 19-31, and further including sending, by the primary memory agent and in response to receipt of the memory read data corresponding to the memory read operation from the secondary memory agent, a memory write operation comprising the memory read data to the memory device.

Example 33 includes the subject matter of any of Examples 19-32, and wherein the secondary memory agent controls a second memory device, wherein the second memory device is a different type from the memory device.

Example 34 includes the subject matter of any of Examples 19-33, and wherein the memory device is a double data rate (DDR) memory device, wherein the second memory device is a three-dimensional crosspoint memory device.

Example 35 includes the subject matter of any of Examples 19-34, and further including detecting, by a performance monitor, the memory write operation sent to the primary memory agent; and detecting, by the performance monitor, the mirrored memory write operation sent to the secondary memory agent by the primary memory agent.

Example 36 includes a compute system comprising means to perform the method of any of Examples 19-35.

Example 37 includes an integrated circuit component comprising a primary memory agent; a secondary memory agent; a performance monitor to detect a memory write operation sent to the primary memory agent; and detect a mirrored memory write operation sent to the secondary memory agent by the primary memory agent.

Example 38 includes the subject matter of Example 37, and wherein the primary memory agent is to receive the memory write operation comprising memory write data; send the memory write data to a memory device for storage; and send the mirrored memory write operation comprising the memory write data to the secondary memory agent.

Example 39 includes the subject matter of any of Examples 37 and 38, and wherein the secondary memory agent is part of the integrated circuit component, wherein to receive the memory write operation comprises to receive the memory write operation over a network-on-a-chip (NoC) from a requestor, wherein the requestor is part of the integrated circuit component, wherein to send the mirrored memory write operation to the secondary memory agent comprises to send the mirrored memory write operation over the NoC.

Example 40 includes the subject matter of any of Examples 37-39, and wherein the secondary memory agent is external to the integrated circuit component, wherein to receive the memory write operation comprises to receive the memory write operation over a network-on-a-chip (NoC) from a requestor, wherein the requestor is part of the integrated circuit component, wherein to send the mirrored memory write operation to the secondary memory agent comprises to send the mirrored memory write operation over an external interconnect.

Example 41 includes the subject matter of any of Examples 37-40, and wherein the external interconnect is a Compute Express Link (CXL).

Example 42 includes the subject matter of any of Examples 37-41, and wherein the primary memory agent is connected to a single memory channel.

Example 43 includes the subject matter of any of Examples 37-42, and wherein the secondary memory agent does not receive any indication that the mirrored memory write operation is mirrored from the primary memory agent.

Example 44 includes the subject matter of any of Examples 37-43, and wherein the primary memory agent is further to receive a memory read operation from a requestor; send the memory read operation to the memory device; receive, from the memory device, an indication that the memory read operation was not successful; send, in response to the indication that the memory read operation was not successful, a mirrored memory read operation to the secondary memory agent; receive memory read data corresponding to the memory read operation from the secondary memory agent; and send the memory read data corresponding to the memory read operation to the requestor.

Example 45 includes the subject matter of any of Examples 37-44, and wherein the primary memory agent is further to send, in response to receipt of the memory read data corresponding to the memory read operation from the secondary memory agent, a memory write operation comprising the memory read data to the memory device.

Example 46 includes the subject matter of any of Examples 37-45, and wherein the primary memory agent is further to determine, in response to receipt of the indication that the memory read operation was not successful, that the memory device is faulty; and set, in response to a determination that the memory device is faulty, a register indicating the memory device is faulty.

Example 47 includes the subject matter of any of Examples 37-46, and wherein the primary memory agent is further to increment, in response to receipt of the indication that the memory read operation was not successful, a register indicating a number of faults of the memory device, wherein to determine that the memory device is faulty comprises to determine that the memory device is faulty.

Example 48 includes the subject matter of any of Examples 37-47, and wherein the primary memory agent is further to receive a second memory read operation from the requestor; determine, based on the register, that the memory device is faulty; send, in response to a determination that the memory device is faulty, a mirrored memory read operation to the secondary memory agent; receive additional memory read data corresponding to the memory read operation from the secondary memory agent; and send the additional memory read data corresponding to the memory read operation to the requestor.

Example 49 includes the subject matter of any of Examples 37-48, and wherein the memory write operation comprises a first transaction identifier, wherein to send the mirrored memory write operation to the secondary memory agent comprises to send the mirrored memory write operation to the secondary memory agent with a second transaction identifier different from the first transaction identifier.

Example 50 includes the subject matter of any of Examples 37-49, and wherein the primary memory agent is further to receive a memory invalidate operation from a requestor; send the memory invalidate operation to the memory device; receive, from the memory device, an indication that the memory invalidate operation was not successful; send, in response to the indication that the memory invalidate operation was not successful, a mirrored memory read operation to the secondary memory agent; receive memory read data corresponding to the mirrored memory read operation from the secondary memory agent; and send, in response to receipt of the memory read data from the secondary memory agent, a data completion message to the requestor.

Example 51 includes the subject matter of any of Examples 37-50, and wherein the primary memory agent is further to send, in response to receipt of the memory read data corresponding to the memory read operation from the secondary memory agent, a memory write operation comprising the memory read data to the memory device.

Example 52 includes the subject matter of any of Examples 37-51, and wherein the secondary memory agent controls a second memory device, wherein the second memory device is a different type from the memory device.

Example 53 includes the subject matter of any of Examples 37-52, and wherein the memory device is a double data rate (DDR) memory device, wherein the second memory device is a three-dimensional crosspoint memory device.

Example 54 includes the subject matter of any of Examples 37-53, and wherein the integrated circuit component is a system-on-a-chip comprising a processor.

Example 55 includes an integrated circuit component comprising means for receiving, by a primary memory agent, a memory write operation comprising memory write data; means for sending, by the primary memory agent, the memory write data to a memory device for storage; and means for sending, by the primary memory agent, a mirrored memory write operation comprising the memory write data to a secondary memory agent.

Example 56 includes the subject matter of Example 55, and wherein the secondary memory agent is part of the integrated circuit component, wherein the means for receiving the memory write operation comprises means for receiving the memory write operation over a network-on-a-chip (NoC) from a requestor, wherein the requestor is part of the integrated circuit component, wherein the means for sending the mirrored memory write operation to the secondary memory agent comprises means for sending the mirrored memory write operation over the NoC.

Example 57 includes the subject matter of any of Examples 55 and 56, and wherein the primary memory agent is part of an integrated circuit component, wherein the secondary memory agent is external to the integrated circuit component, wherein the means for receiving the memory write operation comprises means for receiving the memory write operation over a network-on-a-chip (NoC) from a requestor, wherein the requestor is part of the integrated circuit component, wherein the means for sending the mirrored memory write operation to the secondary memory agent comprises means for sending the mirrored memory write operation over an external interconnect.

Example 58 includes the subject matter of any of Examples 55-57, and wherein the external interconnect is a Compute Express Link (CXL).

Example 59 includes the subject matter of any of Examples 55-58, and wherein the primary memory agent is connected to a single memory channel.

Example 60 includes the subject matter of any of Examples 55-59, and wherein the secondary memory agent does not receive any indication that the mirrored memory write operation is mirrored from the primary memory agent.

Example 61 includes the subject matter of any of Examples 55-60, and further including means for receiving, by the primary memory agent, a memory read operation from a requestor; means for sending, by the primary memory agent, the memory read operation to the memory device; means for receiving, by the primary memory agent and from the memory device, an indication that the memory read operation was not successful; means for sending, by the primary memory agent and in response to the indication that the memory read operation was not successful, a mirrored memory read operation to the secondary memory agent; means for receiving, by the primary memory agent, memory read data corresponding to the memory read operation from the secondary memory agent; and means for sending, by the primary memory agent, the memory read data corresponding to the memory read operation to the requestor.

Example 62 includes the subject matter of any of Examples 55-61, and further including means for sending, by the primary memory agent and in response to receipt of the memory read data corresponding to the memory read operation from the secondary memory agent, a memory write operation comprising the memory read data to the memory device.

Example 63 includes the subject matter of any of Examples 55-62, and further including means for determining, by the primary memory agent and in response to receipt of the indication that the memory read operation was not successful, that the memory device is faulty; and means for setting, by the primary memory agent and in response to a determination that the memory device is faulty, a register indicating the memory device is faulty.

Example 64 includes the subject matter of any of Examples 55-63, and further including means for incrementing, by the primary memory agent and in response to receipt of the indication that the memory read operation was not successful, a register indicating a number of faults of the memory device, wherein the means for determining that the memory device is faulty comprises means for determining that the memory device is faulty.

Example 65 includes the subject matter of any of Examples 55-64, and further including means for receiving, by the primary memory agent, a second memory read operation from the requestor; means for determining, by the primary memory agent and based on the register, that the memory device is faulty; means for sending, by the primary memory agent and in response to a determination that the memory device is faulty, a mirrored memory read operation to the secondary memory agent; means for receiving, by the primary memory agent, additional memory read data corresponding to the memory read operation from the secondary memory agent; and means for sending, by the primary memory agent, the additional memory read data corresponding to the memory read operation to the requestor.

Example 66 includes the subject matter of any of Examples 55-65, and wherein the memory write operation comprises a first transaction identifier, wherein the means for sending the mirrored memory write operation to the secondary memory agent comprises means for sending the mirrored memory write operation to the secondary memory agent with a second transaction identifier different from the first transaction identifier.

Example 67 includes the subject matter of any of Examples 55-66, and further including means for receiving, by the primary memory agent, a memory invalidate operation from a requestor; means for sending, by the primary memory agent, the memory invalidate operation to the memory device; means for receiving, by the primary memory agent and from the memory device, an indication that the memory invalidate operation was not successful; means for sending, by the primary memory agent and in response to the indication that the memory invalidate operation was not successful, a mirrored memory read operation to the secondary memory agent; means for receiving, by the primary memory agent, memory read data corresponding to the mirrored memory read operation from the secondary memory agent; and means for sending, by the primary memory agent and in response to receipt of the memory read data from the secondary memory agent, a data completion message to the requestor.

Example 68 includes the subject matter of any of Examples 55-67, and further including means for sending, by the primary memory agent and in response to receipt of the memory read data corresponding to the memory read operation from the secondary memory agent, a memory write operation comprising the memory read data to the memory device.

Example 69 includes the subject matter of any of Examples 55-68, and wherein the secondary memory agent controls a second memory device, wherein the second memory device is a different type from the memory device.

Example 70 includes the subject matter of any of Examples 55-69, and wherein the memory device is a double data rate (DDR) memory device, wherein the second memory device is a three-dimensional crosspoint memory device.

Example 71 includes the subject matter of any of Examples 55-70, and further including means for detecting, by a performance monitor, the memory write operation sent to the primary memory agent; and means for detecting, by the performance monitor, the mirrored memory write operation sent to the secondary memory agent by the primary memory agent.

The invention claimed is:
1. An integrated circuit component comprising:
a primary memory agent to:
    receive a memory write operation comprising memory write data;
    send the memory write data to a memory device for storage; and
    send a mirrored memory write operation comprising the memory write data to a secondary memory agent, wherein the secondary memory agent is external to the integrated circuit component,
wherein to receive the memory write operation comprises to receive the memory write operation over a network- on-a-chip (NoC) from a requestor, wherein the requestor is part of the integrated circuit component,
wherein to send the mirrored memory write operation to the secondary memory agent comprises to send the mirrored memory write operation over an external interconnect.

2. The integrated circuit component of claim 1, wherein the primary memory agent is connected to a single memory channel.

3. The integrated circuit component of claim 1, wherein the secondary memory agent does not receive any indication that the mirrored memory write operation is mirrored from the primary memory agent.

4. The integrated circuit component of claim 1, wherein the primary memory agent is further to:
receive a memory read operation from a requestor;
send the memory read operation to the memory device;
receive, from the memory device, an indication that the memory read operation was not successful;
send, in response to the indication that the memory read operation was not successful, a mirrored memory read operation to the secondary memory agent;
receive memory read data corresponding to the memory read operation from the secondary memory agent; and
send the memory read data corresponding to the memory read operation to the requestor.

5. The integrated circuit component of claim 4, wherein the primary memory agent is further to:
determine, in response to receipt of the indication that the memory read operation was not successful, that the memory device is faulty; and
set, in response to a determination that the memory device is faulty, a register indicating the memory device is faulty.

6. The integrated circuit component of claim 5, wherein the primary memory agent is further to:
receive a second memory read operation from the requestor;
determine, based on the register, that the memory device is faulty;
send, in response to a determination that the memory device is faulty, a mirrored memory read operation to the secondary memory agent;
receive additional memory read data corresponding to the memory read operation from the secondary memory agent; and
send the additional memory read data corresponding to the memory read operation to the requestor.

7. The integrated circuit component of claim 5, wherein the primary memory agent is further to increment, in response to receipt of the indication that the memory read operation was not successful, a register indicating a number of faults of the memory device,
wherein to determine that the memory device is faulty comprises to determine that the memory device is faulty.

8. The integrated circuit component of claim 1, wherein the memory write operation comprises a first transaction identifier,
wherein to send the mirrored memory write operation to the secondary memory agent comprises to send the mirrored memory write operation to the secondary memory agent with a second transaction identifier different from the first transaction identifier.

9. The integrated circuit component of claim 1, wherein the primary memory agent is further to:
receive a memory invalidate operation from a requestor;
send the memory invalidate operation to the memory device;
receive, from the memory device, an indication that the memory invalidate operation was not successful;
send, in response to the indication that the memory invalidate operation was not successful, a mirrored memory read operation to the secondary memory agent;
receive memory read data corresponding to the mirrored memory read operation from the secondary memory agent; and
send, in response to receipt of the memory read data from the secondary memory agent, a data completion message to the requestor.

10. The integrated circuit component of claim 1, wherein the secondary memory agent controls a second memory device, wherein the second memory device is a different type from the memory device.

11. The integrated circuit component of claim 10, wherein the memory device is a double data rate (DDR) memory device, wherein the second memory device is a three-dimensional crosspoint memory device.

12. The integrated circuit component of claim 1, wherein the integrated circuit component is a system-on-a-chip comprising a processor.

13. The integrated circuit component of claim 1, further comprising:
a performance monitor to:
detect a memory write operation sent to the primary memory agent; and
detect a mirrored memory write operation sent to the secondary memory agent by the primary memory agent.

14. The integrated circuit component of claim 1, wherein the memory write operation comprises a first transaction identifier,
wherein to send the mirrored memory write operation to the secondary memory agent comprises to send the mirrored memory write operation to the secondary memory agent with a second transaction identifier different from the first transaction identifier.

15. The integrated circuit component of claim 1, wherein the primary memory agent is further to:
receive a memory invalidate operation from a requestor;
send the memory invalidate operation to the memory device;
receive, from the memory device, an indication that the memory invalidate operation was not successful;
send, in response to the indication that the memory invalidate operation was not successful, a mirrored memory read operation to the secondary memory agent;
receive memory read data corresponding to the mirrored memory read operation from the secondary memory agent; and
send, in response to receipt of the memory read data from the secondary memory agent, a data completion message to the requestor.

16. A method comprising:
receiving, by a primary memory agent, a memory write operation comprising memory write data, wherein the primary memory agent is part of an integrated circuit component;
sending, by the primary memory agent, the memory write data to a memory device for storage; and sending, by the primary memory agent, a mirrored memory write operation comprising the memory write data to a secondary memory agent,
wherein the primary memory agent is part of an integrated circuit component,
wherein the secondary memory agent is external to the integrated circuit component,
wherein receiving the memory write operation comprises receiving the memory write operation over a network-on-a-chip (NoC) from a requestor, wherein the requestor is part of the integrated circuit component,
wherein sending the mirrored memory write operation to the secondary memory agent comprises sending the mirrored memory write operation over an external interconnect.

17. The method of claim 16, wherein the primary memory agent is connected to a single memory channel.

18. The method of claim 16, wherein the secondary memory agent does not receive any indication that the mirrored memory write operation is mirrored from the primary memory agent.

19. An integrated circuit component comprising:
a primary memory agent;
a secondary memory agent; and
a performance monitor to:
  detect a memory write operation sent to the primary memory agent; and
  detect a mirrored memory write operation sent to the secondary memory agent by the primary memory agent,
wherein the primary memory agent is to:
  receive a memory invalidate operation from a requestor;
  send the memory invalidate operation to a memory device;
  receive, from the memory device, an indication that the memory invalidate operation was not successful;
  send, in response to the indication that the memory invalidate operation was not successful, a mirrored memory read operation to the secondary memory agent;
  receive memory read data corresponding to the mirrored memory read operation from the secondary memory agent; and
  send, in response to receipt of the memory read data from the secondary memory agent, a data completion message to the requestor.

20. The integrated circuit component of claim 19, wherein the primary memory agent is to:
receive the memory write operation comprising memory write data;
send the memory write data to a memory device for storage; and
send the mirrored memory write operation comprising the memory write data to the secondary memory agent.

* * * * *